INVENTOR.
W.C. McCARTHY
BY
Young & Quigg
ATTORNEYS

INVENTOR.
W.C. McCARTHY
BY
Young & Quigg
ATTORNEYS

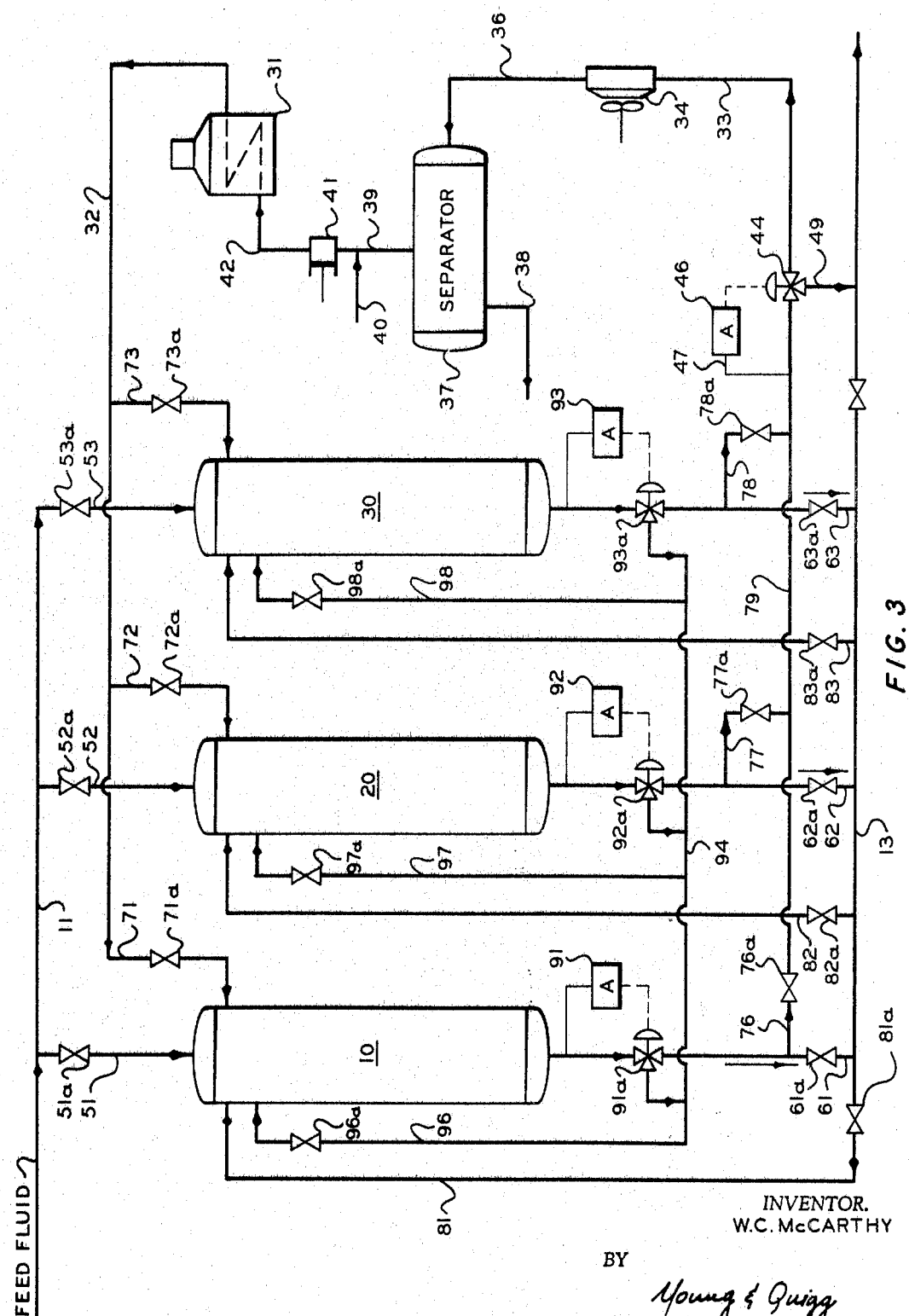

United States Patent Office 3,485,013
Patented Dec. 23, 1969

3,485,013
SEPARATION OF FLUID MIXTURES
William C. McCarthy, Bartlesville, Okla., assignor to
Phillips Petroleum Company, a corporation of Delaware
Filed Oct. 17, 1967, Ser. No. 675,948
Int. Cl. B01d 53/00
U.S. Cl. 55—18                                        8 Claims

ABSTRACT OF THE DISCLOSURE

A cyclic method of separating components from a fluid mixture wherein the effluent from the cooling or regenerated sorbent is analyzed for the component which was sorbed from the mixture in the sorption cycle; in response to the analysis the effluent is either passed to a sorption zone on sorption cycle or is combined with the primary effluent from the sorption cycle. Also, effluent from the regeneration step is analyzed, the regeneration effluent being combined with the primary effluent until analysis shows a desired level of removed component in the regeneration effluent, whereupon the regeneration circuit is closed.

---

This invention relates to separating at least one component from a fluid mixture utilizing a plurality of sorbent zones. In one aspect the invention relates to an improved method of regenerating sorbent zones. In another aspect, the invention relates to an improved method of cooling regenerated sorption zones.

In many industrial processes, the separation of fluid mixtures is necessary to the operation of the process. Selective adsorption is one conventional method of removing a component from a fluid mixture. For example, selective adsorption is used in the separation of the following: nitrogen and air from helium, in the separation of light hydrocarbons (ethane plus) from natural gas, in the separation of aromatic hydrocarbons from paraffinic hydrocarbons, and the separation of normal paraffins from branched chain paraffins. The particular adsorptive material used in the separation has an affinity for the component removed and will become "loaded," necessitating regeneration or purging of the adsorbed component.

Often two adsorption zones are provided with one zone adsorbing while the other is being regenerated, after which the flows are switched, whereby the process is basically a cyclic batch type process. A third adsorption zone can be employed in such a process to provide additional flexibility in the regeneration and cooling steps. Conventionally, adsorption zones are regenerated by passing hot regeneration fluid through the "loaded" zone to desorb the adsorbed component; the component is recovered from the regeneration fluid and the fluid is reheated and circulated back through the zone to desorb more of the component. Such a regeneration method is known as a closed circuit regeneration. Just prior to regeneration, the adsorption zone contains a volume of the feed mixture and this dilutes the regeneration gas, which is undesirable in a closed circuit regeneration.

Feed fluid or effluent from the adsorption cycle is often used to cool the hot regeneration zone prior to putting the zone back on stream. The adsorption zone after regeneration contains a volume of regeneration gas and desorbed component, thus the first portion of cooling effluent contains valuable components which are removed from the system when the cooling gas is passed to residue or combined with the effluent from the adsorption cycle.

By the practice of the invention, wherein regeneration effluent and cooling effluent are analyzed for the component removed from the fluid mixture and either recycled to the process or combined with residue fluids in response to the analysis, the efficiency of a sorption process is greatly increased.

Accordingly it is an object of the invention to provide an improved method of separating components from a fluid mixture.

Another object of the invention is to increase the yield of component or components removed from a fluid mixture by sorption.

Another object of the invention is to provide an improved method of regenerating sorption zones.

These and other objects will be apparent to one skilled in the art upon consideration of the following disclosure, drawings, and appended claims.

FIGURE 3 is a detailed flow diagram illustrating the control valves and conduits for switching flow through the various adsorption zones shown in FIGURES 1 and 2.

Figure 1:
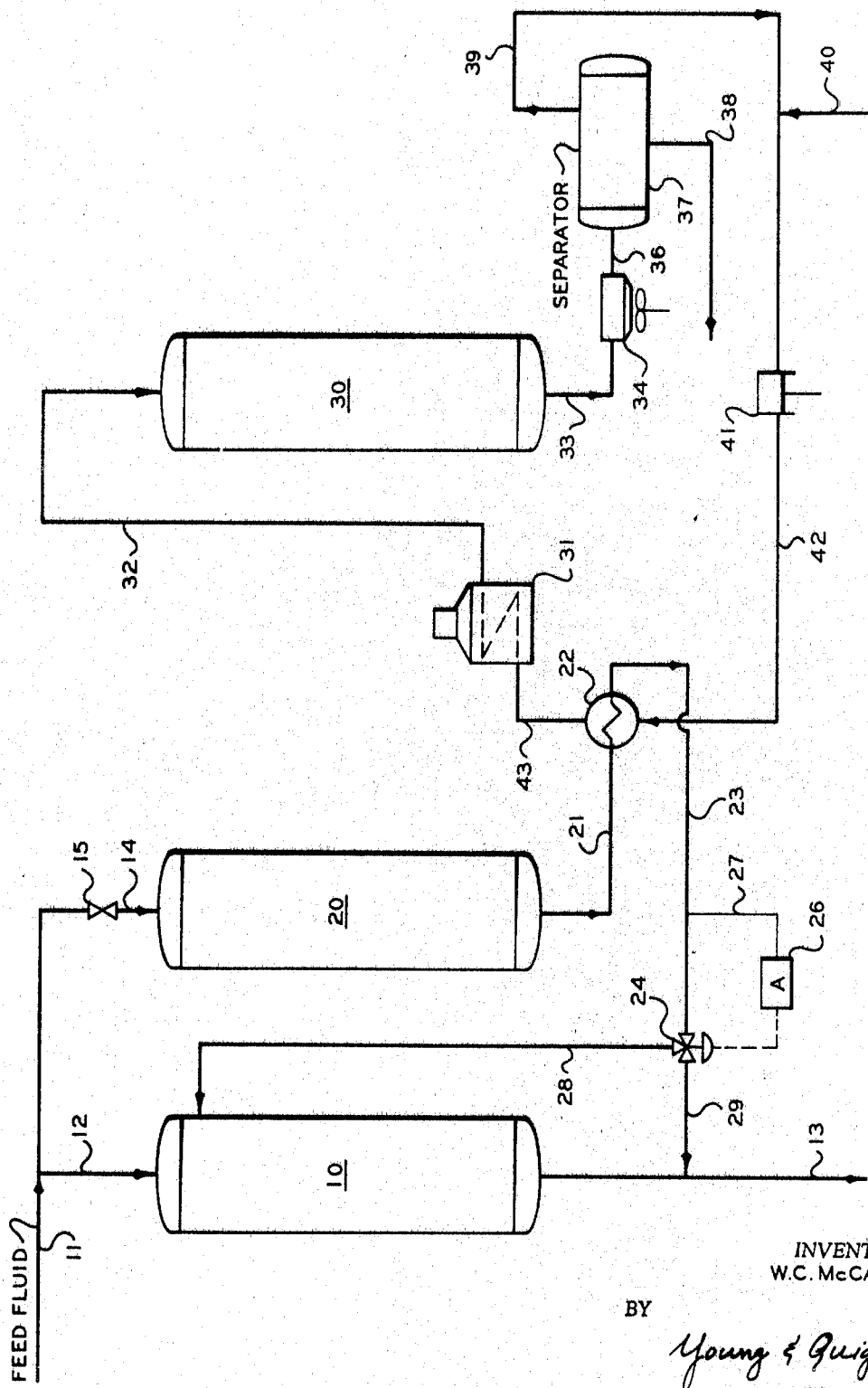
FIGURE 1 is a schematic flow diagram of one embodiment of the invention.

According to the invention, there is provided a method of separating a component or components from a fluid mixture utilizing a plurality of sorption zones comprising flowing a fluid mixture stream through a first sorption zone in a sorption cycle to remove the desired component, recovering effluent from the first zone as a primary fluid stream; simultaneously passing a cooling fluid through a second sorption zone, which has been previously regenerated, to cool the second zone to a desired low temperature level and recovering purge fluid containing the removed component therefrom as cooling effluent, analyzing the cooling effluent to determine the concentration of removed component therein, thereafter passing the cooling effluent to the first sorption zone in response to analysis showing the concentration to be above a predetermined level or passing the cooling effluent from the sorption process, for example, to the primary effluent stream, in response to an analysis showing the concentration to be below the predetermined level.

Further in accordance with the invention, the above-described method is combined with the steps of simultaneously passing hot regeneration fluid through a third sorption zone to desorb the component removed from the fluid mixture in a previous sorption cycle, recovering a regeneration effluent, thereafter separating and recovering the removed component from the regeneration effluent as product.

Further in accordance with the invention, hot regeneration fluid is passed in a modified closed circuit through a sorption zone, desorbing the removed component, to recover a regeneration effluent. The regeneration effluent is analyzed to determine the concentration of removed component therein; in response to analysis showing a concentration below a predetermined level the regeneration effluent is passed from the closed circuit, or in response to analysis showing a concentration of the predetermined level the regeneration effluent is passed into the regeneration circuit wherein the component is separated and recovered, and the regeneration fluid is heated and recirculated to the sorption zone.

Since the type of separation described herein is dependent upon principles which are well understood it will be apparent to one skilled in the art that the invention is to be limited with respect to the method and not with respect to the conditions which prevail in any particular adsorber or absorber. The method of the claimed invention includes within its scope the use of various absorbents and adsorbents. Thus, "ab" and "ad" in the words absorption and adsorption are in this case intended to be within the scope of "sorption" as used in this application.

The invention is equally applicable to the separation of gaseous mixtures or liquid mixtures. A portion of the fluid feed mixture or the primary effluent from the sorption cycle can be used to cool a hot regenerated sorption zone. The temperature level to which the sorption zone is cooled before going back on stream is determined by the feed conditions and composition as well as the characteristics of the particular sorptive material employed. The sorptive material employed is one which has an affinity for the component or components to be removed. If desired, the sorption zone can be packed with a number of different materials arranged in layers so that a great number of components can be removed from a fluid mixture. Typical sorbents available for use in the invention include activated carbon, alumina, silica gel, charcoal, bone char, and molecular sieve materials such as zeolites.

In the following description, reference will be made to the adsorptive separation of propane and heavier hydrocarbons from a natural gas stream, but it is to be understood that this is for the purpose of illustration and that the invention is not to be limited to the separation of any particular fluid mixture or the use of any particular sorbent.

Referring now to the drawings, wherein like reference numerals denote like elements in the different figures, the invention will be described in detail. In FIGURE 1, three adsorption zones 10, 20 and 30 are illustrated with a minimum of auxiliary equipment for clarity in the drawings. As depicted, zone 10 is on an adsorption cycle, zone 20 is being cooled and zone 30 is being regenerated. As will be explained hereinafter, after the adsorption cycle is completed a shift is made so that zone 20 is on an adsorption cycle, zone 30 is being cooled and zone 10 is being regenerated. All the adsorption zones are packed with a suitable adsorbent, such as silica gel or charcoal. In this embodiment, three adsorption zones are illustrated but in certain processes it may be desirable to place additional adsorption zones in series with the zone which is on the adsorption cycle. The method of the invention is also applicable to a process utilizing only two adsorption zones, with one being on adsorption while the other is being regenerated and cooled.

A natural gas stream, comprising principally methane and containing ethane and heavier hydrocarbons, is passed via conduits 11 and 12 into adsorption zone 10 which is on an adsorption cycle. As the gas stream passes downwardly through the zone, substantially all the water, some ethane and a major portion of the propane and heavier hydrocarbons are removed from the fluid mixture. The dry lean gas is recovered from zone 10 as primary effluent via conduit 13 and passed to a pipe line or storage.

Adsorption zone 20 has been previously regenerated and contains a volume of hot regeneration gas and desorbed components. Since the adsorptive material is more effective at lower temperatures, it is cooled before going back on stream in an adsorption cycle. A portion of the natural gas stream, which is generally near ambient temperature, is passed through conduit 14 and valve 15 into zone 20. The natural gas stream is passed downwardly through the zone displacing hot regeneration fluid and desorbed component and cooling the zone. The cooling effluent is removed via conduit 21 and passed through heat exchanger 22 to preheat regeneration gases.

The cooling effluent is removed from heat exchanger 22 and passed through conduit 23 which contains a three-way motor valve 24. An analyzer 26 having a sample line 27 analyzes the cooling effluent as it passes through conduit 23. The first portion of cooling effluent removed from zone 20 is rich in hydrocarbons because the regeneration gas and desorbed components are being displaced. Motor valve 24 is regulated in response to the concentration of hydrocarbon components in the cooling effluent. Any suitable analyzer or method of analysis may be used in the practice of the invention. A preferred chromatographic analyzer is disclosed in the Patent No. 3,062,038 to Buell O. Ayres.

A signal representative of an analysis showing a concentration above a predetermined level, for example, the concentration level of hydrocarbons in the feed stream, positions the valve so that cooling effluent is passed through conduit 28 to adsorption zone 10 wherein the valuable components are recovered. Analysis showing concentrations below the predetermined level result in the diversion of flow through conduit 29 to conduit 13 where the cooling effluent is combined with the lean primary effluent and removed from the adsorption process. When the adsorption zone 20 has been cooled to a desired temperature, valve 15 in conduit 14 is closed and the zone is ready to go on stream when adsorption zone 10 becomes loaded with the removed component. Passing the hydrocarbon rich cooling stream to the adsorption cycle in response to the analysis increases the yield of valuable hydrocarbons.

FIGURE 1 also illustrates a conventional closed circuit regeneration system. Regeneration gas is heated in furnace 31 to a desired high temperature and passed via conduit 32 into adsorption zone 30. Propane is one readily available regeneration fluid which can be used in the process. Some of the feed fluid in stream 11 can also be used. Temperatures in the range of 450° F. to 750° F. are employed in this particular type of regeneration. As the hot gas passes downwardly through the adsorbent, the components which were removed from the feed stream in a previous adsorption cycle are desorbed. Regeneration effluent is recovered via conduit 33 and passed through a condenser 34 to condense the heavier hydrocarbon fractions. The cooled regeneration effluent is passed via conduit 36 to a vapor liquid separator 37. Valuable liquid hydrocarbons are removed from separator 37 via conduit 38 for marketing or further processing.

Regeneration gas is removed overhead via conduit 39, additional regeneration gas is added, if necessary, through conduit 40, and the gas is compressed in compressor 41. From compressor 41 the regeneration gas is passed through conduit 42 to heat exchanger 22 wherein it is preheated by indirect heat exchange with the effluent from zone 20. The preheated regeneration gas is passed through conduit 43 to furnace 31 where it is heated to the desired regeneration temperature and recirculated to adsorption zone 30.

Figure 2:
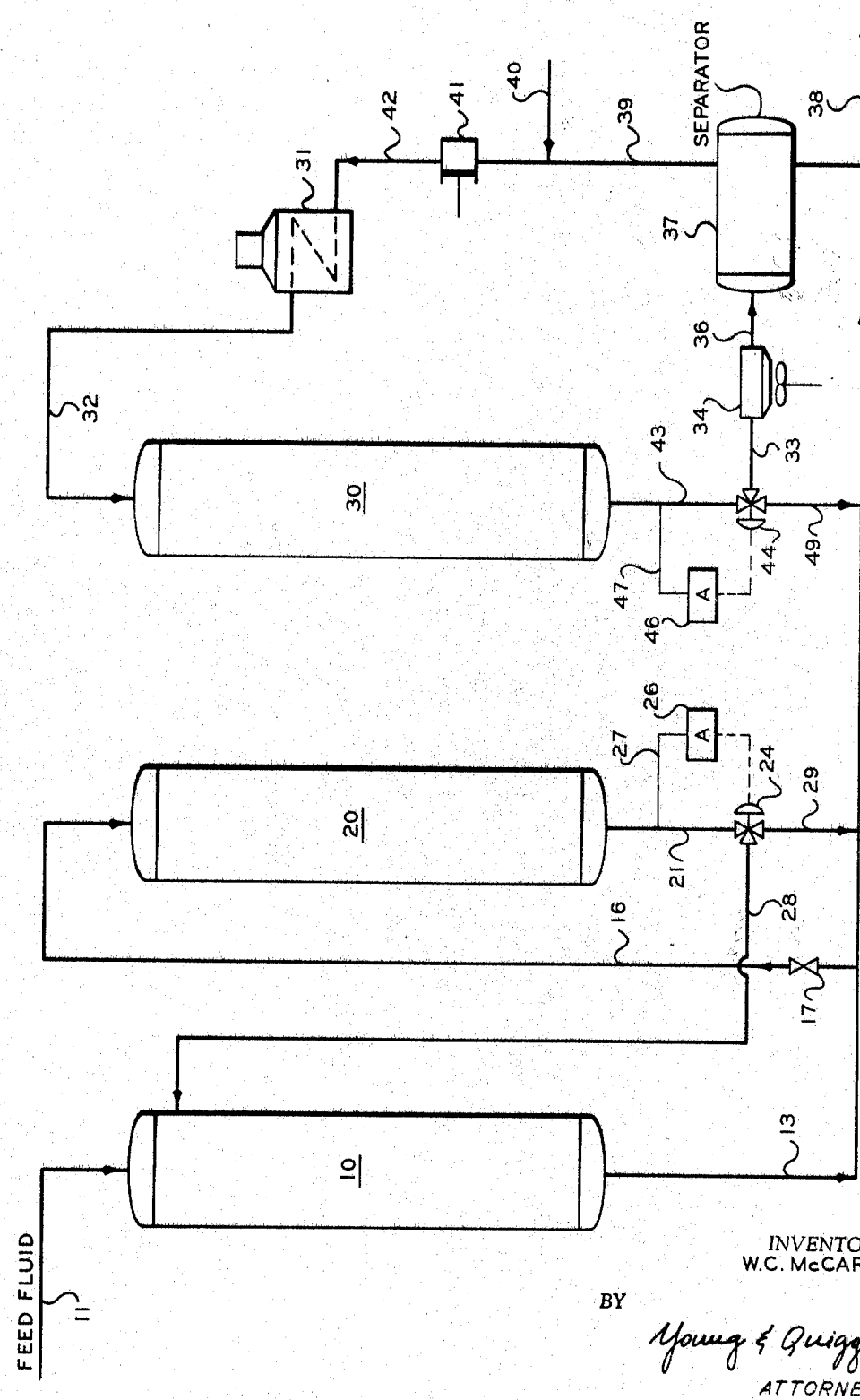
FIGURE 2 is a schematic flow diagram of another embodiment of the invention.

FIGURE 2 illustrates another embodiment from the invention wherein lean primary effluent is employed as the cooling gas and the regeneration circuit is modified to minimize dilution of the regeneration gas. To simplify the drawing, heat exchangers and other auxiliary equipment have been omitted.

The natural gas stream flows via conduit 11 through adsorption zone 10 and lean primary effluent is recovered via conduit 13. All or a portion of the lean gas is passed through conduit 16 and valve 17 into adsorption zone 20 to cool the zone. The cooling effluent composition is analyzed and the effluent is either passed through conduit 28 to zone 10 or through conduit 29 to conduit 13 in response to the analysis as was described with reference to FIGURE 1. When adsorption zone 20 has been cooled to the desired temperature valve 17 is closed and the zone is ready to go on stream.

In the regeneration circuit, hot regeneration effluent is recovered from adsorption zone 30 via conduit 43 and there-way valve 44. Prior ot regeneration adsorption zone 30 has been on an adsorption cycle and contains a volume of feed gas. The feed gas has a low dew point (i.e. must be cooled to a low temperature before liquefaction of contained hydrocarbons takes place) and if mixed with the high dew point regeneration gas in sufficient quantity will necessitate the use of refrigeration to condense the desorbed component from the regeneration fluid. To minimize this undesirable dilution of the regeneration gas, an analyzer 46 having a sample line 47 is provided to determine the composition of the regeneration effluent flowing in conduit 43. A signal representing an analysis showing less than a desired hydrocarbon content in the effluent controls valve 44 so that the lean gas is passed through conduit 49 and combined in conduit 13 with the primary effluent. Analysis showing the hydrocarbon content to be above the predetermined minimum concentration results in closing flow through conduit 49 and passing the regeneration effluent through conduit 33 to condenser 34 and separator 37, wherein valuable components are recovered. By controlling flow in response to the analysis the dilution of regeneration gas is minimized and the dew point of the recirculating regeneration gas is increased.

Referring now to FIGURE 3, illustrating the values and conduits for shifting the various zones cyclically from adsorption to regeneration to cooling, the natural gas stream is fed to the adsorption cycle through conduit 51 and valve 51A into zone 10, through conduit 52 and valve 52A to adsorption zone 20, or through conduit 53 and valve 53A to zone 30. These same conduits and valves are used when a portion of the feed stream is employed to cool the zones after regeneration.

Lean primary effluent from the adsorption cycle of zones 10, 20 and 30 is recovered through conduits 61 and valve 61A, conduit 62 and valve 62A and conduit 63 and valve 63A respectively and is passed via conduit 13 to marketing or storage.

Hot regeneration gas from the circuit shown in FIGURE 2 is passed to zone 10 via conduit 71 and valve 71A; to zone 20 via conduit 72 and valve 72A; or to zone 30 via conduit 73 and valve 73A. Regeneration effluent is recovered from the zones through conduit 76 and valve 76A, conduit 77 and valve 77A, or conduit 78 and valve 78A; and is passed through conduit 79 to valve 44. Analyzer 46 determines the composition of the regeneration effluent in conduit 79 and controls valve 44 in response thereto, as described hereinbefore.

Lean primary effluent in conduit 13 can be passed through conduit 81 via valve 81A to cool zone 10; through conduit 82 via valve 82A to cool zone 20; or through conduit 83 via valve 83A to cool zone 30.

Analyzers 91, 92 and 93 are provided to control valves 91A, 92A, 93A respectively in response to the concentration of hydrocarbons in the cooling effluent. The cooling effluent is either passed to conduit 13 and combined with the lean primary effluent or is passed to conduit 94. From conduit 94 the rich cooling effluent can be passed via conduit 96, 97 or 98 to the particular zone which is on an adsorption cycle at that time.

Analyzing the cooling effluent and controlling the disposition thereof in response to the analysis as set forth in the invention increases the yield of valuable components in the separation of liquid mixtures by recovering these components from the cooling gas which would otherwise be lost from the process. Analysis of the regeneration effluent and control of flows in response thereto prevents the undesirable dilution of regeneration fluids. Reasonable modification and variation are within the scope of the invention.

That which is claimed is:
1. A method of separating at least one component from a fluid mixture stream utilizing a plurality of sorbent zones comprising:
   passing said fluid mixture through a first sorbent zone in a sorbing cycle to remove said component and recovering a lean primary fluid stream;
   simultaneously passing a cooling stream through a second sorbent zone which has been previously regenerated to cool said second sorbent zone to a desired temperature level and purge fluid rich in the removal component therefrom as cooling effluent;
   analyzing said cooling effluent for said removed component;
   passing said cool effluent to said first sorbent zone in response to analysis showing the removed component to be present in amounts above a predetermined concentration;
   thereafter combining said cooling effluent with said primary field stream in response to analysis showing the removed component to be present in amounts less said predetermined level.

2. The method of claim 1 wherein said fluid mixture comprises natural gas and the removed component comprises propane and heavier hydrocarbons.

3. The method of claim 1 wherein said cooling stream comprises a portion of said fluid mixture stream.

4. The method of claim 1 wherein said cooling stream comprises at least a portion of said lean primary fluid stream.

5. The method of claim 1 wherein said sorbent zones contains a sorptive material selected from the group comprising activated carbon, alumina, silica gel, charcoal, bone char and molecular sieve materials.

6. The method of claim 1 including the steps of:
   simultaneously passing hot regeneration fluid through a third sorbent zone to desorb the component removed from said fluid mixture in a previous sorption cycle to recover a regeneration effluent;
   thereafter separating the removed component from the regeneration fluid in a separation zone, and
   recovering the removed component as product.

7. The method of claim 6 including:
   analyzing said regeneration effluent for said removed component;
   combining said regeneration effluent with said primary fluid stream in response to analysis showing a concentration of removed component below a certain desired level;
   thereafter passing said regeneration fluid to said separation zone in response to analysis showing said removed component present in a concentration above said desired level.

8. The method of claim 6 including cyclically shifting each of said sorbent zones from sorption to regeneration and from regeneration to cooling cycles.

References Cited

UNITED STATES PATENTS 3,164,980   1/1965   Loyd _____ 73—23.1
3,192,687   7/1965   Silva et al. _____ 55—62

REUBEN FRIEDMAN, Primary Examiner

CHARLES N. HART, Assistant Examiner

UNITED STATES PATENT OFFICE

CERTIFICATE OF CORRECTION

Patent No. 3,485,013                            Dated: December 23, 1969

William C. McCarthy

It is certified that error appears in the above-identified patent and that said Letters Patent are hereby corrected as shown below:

Column 6, line 3, after "mixture" insert --- stream ---; column 6, line 9, delete "emoval" and insert --- removed ---; column 6, line 18, delete "field" and insert --- uid ---; column 6, line 19, after "less" insert --- than ---; column 6, line 30, delete "contains" and insert --- contain ---; column 6, line 39, after "zone" delete "," and insert --- ; ---.

SIGNED AND
SEALED

JUL 7 1970

(SEAL)
Attest:

Edward M. Fletcher, Jr.
Attesting Officer

WILLIAM E. SCHUYLER, JR.
Commissioner of Patents